United States Patent

Nealy

[11] 4,076,527
[45] Feb. 28, 1978

[54] PHOTOSENSITIVE COMPOSITION USEFUL IN PHOTOELECTROPHORETIC IMAGING

[75] Inventor: Richard H. Nealy, Penfield, N.Y.

[73] Assignee: Xerox Corporation, Stamford, Conn.

[21] Appl. No.: 735,355

[22] Filed: Oct. 26, 1976

[51] Int. Cl.² .................. G03G 5/04; G03G 16/00
[52] U.S. Cl. .................. 96/1 PE; 204/181 R; 204/180 R
[58] Field of Search .......... 96/1 PE, 1.1, 1.5; 355/3 P; 204/180, 181

[56] References Cited

U.S. PATENT DOCUMENTS

| | | | |
|---|---|---|---|
| 3,382,214 | 5/1968 | Haas | 96/1.6 |
| 3,825,422 | 7/1974 | Gruber et al. | 96/1 PE |
| 3,953,207 | 4/1976 | Horgan | 96/1 PC |
| 3,956,524 | 5/1976 | Weigl | 96/1.5 |

*Primary Examiner*—David Klein
*Assistant Examiner*—John L. Goodrow
*Attorney, Agent, or Firm*—James J. Ralabate; Eugene O. Palazzo; John E. Crowe

[57] ABSTRACT

Photosensitive composition for use in photoelectrophoretic imaging systems. The particulate component of this composition includes vanadyl phthalocyanine pigment particles which have been treated with a phenazine-type dye and a mixture of polymeric materials consisting essentially of at least one polymer having structural units of the formula

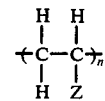

wherein Z is a pendant group of the formula

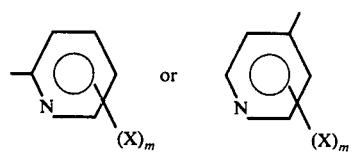

X is a substituent substantially incapable of withdrawing electrons from the electron rich pyridinyl moiety;
$m$ is a whole number from 0 to 3; and
$n$ is a whole number in excess of 25;

and, at least one polymer having structural units of the formula

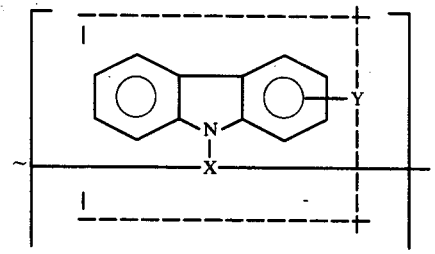

wherein X is vinyl, alpha alkyl substituted vinyl, or alkyl of 1 to 4 carbon atoms, and
Y is vinyl, alpha alkyl substituted vinyl or alkyl of 1 to 4 carbon atoms with the proviso that when only one of either X or Y is vinyl or alpha alkyl substituted vinyl per structural unit.

8 Claims, No Drawings

PHOTOSENSITIVE COMPOSITION USEFUL IN PHOTOELECTROPHORETIC IMAGING

BACKGROUND OF THE INVENTION

1. Field of the Invention

This invention relates to improved photosensitive compositions and their use in photoelectrophoretic imaging methods and apparatus. More specifically, this invention is directed to the treatment of vanadyl phthalocyanine pigments with a combination of phenazine-type dyes and a mixture containing at least two polymers. Such treatment results in modification of the photoresponsiveness of the treated pigment and also thereby inhibits the injection of charge into the treated pigment from other sources.

2. Description of the Prior Art

As is generally recognized in the art, a photoelectrophoretic imaging system is one wherein electrically photosensitive particles dispersed in a carrier liquid are initially subjected to an electric field and either simultaneously or thereafter exposed to activating electromagnetic radiation conforming to an image pattern. Photoelectrophoretic imaging techniques may be adapted for the preparation of both monochromatic and polychromatic reproductions. A detailed disclosure of both these monochromatic and polychromatic photoelectrophoretic imaging systems can be found in U.S. Pat. Nos. 3,383,933; 3,384,488; 3,384,565 and 3,384,566 (all of which are hereby incorporated by reference in their entirety). In one of the preferred embodiments of the photoelectrophoretic imaging method described in the above patents, a layer of an imaging suspension comprising electrically photosensitive pigment particles in an insulating carrier liquid is arranged between an injecting electrode and a blocking electrode (at least one of the electrodes being at least partially transparent); the photosensitive dispersion subjected to an applied electric field; and thereafter exposed to activating electromagnetic radiation conforming to an image pattern. Typically, complementary images are formed on the opposing surfaces of the electrodes which are in contact with the dispersion of pigment particles. In a monochromatic system, pigment particles of only one color are required; however, particles of more than one shade of the same color may be utilized where one desires to provide the capability to produce a range of monochromatic colors. In a polychromatic system, images of more than one color, and preferably full color, may be formed by utilizing a plurality of differently colored pigment particles which ideally have spectral response curves which do not substantially overlap each other, thereby providing the necessary color separation. In the preferred photoelectrophoretic imaging system referred to hereinabove, the pigment particles correspond to the substractive colors yellow, cyan and magenta. The yellow pigment particles are primarily responsive to light within the blue region of the electromagnetic spectrum; the cyan particles are primarily photoresponsive to light within the red region of the electromagnetic spectrum; and the magenta particles are primarily responsive to light within the green region of the electromagnetic spectrum. Therefore, when a full color reproduction is projected upon a suspension containing these three pigments, the cyan particles will respond to that component of the image input corresponding to the color red, and upon being photoactivated will migrate from the electrode surface on which the image is to be formed thereby leaving behind the yellow and magenta pigment particles which together appear as red. Similarly, image input corresponding to green light will cause magenta particles to migrate and image input corresponding to blue light will cause the yellow particles to migrate. Where white light impinges upon the suspension containing the above three pigment particles, all such particles should migrate thereby leaving the surface of the image substantially devoid of pigment. The resulting image can thereafter be transferred to a receiving sheet, such as white paper, and thus the portions of the image which are deficient of pigment will appear as white in the finished copy. In order to obtain good color separation, it would be preferable that each pigment migrate only in response to activating electromagnetic radiation within its principle region of absorption.

Due to electrical interactions between the pigments and other unknown factors, photostimulated particle migration is often incomplete resulting in traces of the "subtracted" pigment remaining at the injecting electrode thereby imparting undesired color to the image formed on this electrode.

As is discussed in the patents previously incorporated by reference, the pigment particles used in photoelectrophoretic imaging systems are initially charged and caused to migrate to the surface of one of two opposing electrodes in response to an electric field established between these electrodes. Upon absorption of light within its principal region of photoresponse, these pigments, it is theorized, generate hole-electron pairs and, depending upon the relative mobility of these charge carriers in the pigment, either one or both of these charge carriers are injected into the liquid carrier medium. Upon the injection of only one species of carrier into the medium, the particle will thereby acquire a net charge which preferably will be identical in sign to the polarity of charge of the electrode to which it had previously migrated. This similarity in net charge will cause the pigment particle to be repelled by this formerly attractive electrode resulting in its migration to the surface of the opposing electrode where it forms a complementary image. It will be appreciated that if the above theoretical explanation is correct, the injection of both species of charge carrier into the liquid carrier medium will result in a failure of the photoactivated particle to migrate and thus in failure to generate the desired image. Moreover, in the event of indiscriminate injection of charge carriers from the photoactivated pigment into the liquid carrier medium and the subsequent transfer of such carriers to a non-photoactivated particle, the non-photoactivated pigment particle will migrate just as if it had absorbed the imaging energy. This migration of non-photoactivated particles will seriously impair color separation in the desired reproduction.

It thus appears that in order for good color separation to be maintained and faithful reproduction of an original to be achieved, it is necessary to maintain selective electrophotographic response of the pigments to their colors of primary absorption. It is also apparent that this can only be achieved by preventing indiscrimate injection of charge carriers from photoactivated pigments into the liquid carrier medium.

The prior art contains frequent reference to various treatment of photoelectrophoretic pigments with diverse materials in order to modify or enhance the electrophotographic response of such pigments. The literature discloses, for example, (a) the adsorption of donor and acceptor molecules on pigments utilized in photoelectrophoretic imaging, (b) the inclusion of such electrically active materials in the insulating liquid carrier containing such pigment particles, or (c) the application of these electrically active materials to one of the electrodes used in confining the pigment dispersion. All of the above treatments are said to result in charge transfer complex formation between the pigments and these electrically active materials, thereby facilitating injection of electrons from photoactivated pigment particles into the surrounding medium, U.S. application Ser. No. 566,846, filed July 21, 1966, now abandoned; published in Japan on Mar. 20, 1970, application Ser. No. 463,667, filed July 20, 1967.

Photoactive polymeric materials have also been disclosed as effective in modification of the electrophoretic response of pigment particles used in photoelectrophoretic imaging systems, U.S. application Ser. No. 863,507, filed Oct. 3, 969, published in Holland on Apr. 6, 1971 as application Ser. No. 70.14614. Poly(N-vinylcarbazone) is disclosed in this Dutch patent as useful in the agglomeration and/or encapsulation of photomigratory pigment particles thereby enhancing the electrophotographic response of these particles to imaging energies.

The prior art systems referred to hereinabove are primarily concerned with the "enhancement" in the photoresponse characteristics of the pigments involved in such treatment. Under certain conditions, however, it may prove desirable to reduce the degree of photoresponsiveness of the pigment particles; as in the case where such photoactivated pigments tend to interact with non-activated pigment particles, or are substantially more photoresponsive (in terms of migrational efficiency and speed) than other photoactivated pigments also present in the imaging suspension.

Accordingly, it is the object of this invention to provide a method for treatment of pigment particles designed to inhibit the photoresponsiveness of materials in a photoelectrophoretic environment.

More specifically, it is the object of this invention to provide a photosensitive composition which is both inhibited from interaction with non-photoactivated pigments and also relative resistant to acceptance of charge from other materials used in conjunction therewith.

It is another object of this invention to provide a method for balancing the photoresponsiveness of a pigment so as to reduce its photomigratory response in relation to other pigments used in conjunction therewith.

Additional objects of this invention include the preparation of photosensitive composition according to the above methods and the use of such compositions in photostimulated particle migration imaging systems.

SUMMARY OF THE INVENTION

The above and related objects are achieved by providing a photosensitive composition containing a vanadyl phthalocyanine pigment in an insulating carrier liquid. In addition to the pigment, the composition also contains, in at least partial association with said pigment, i. from about 0.01 to about 10 weight percent of a desensitizing dye of the formula

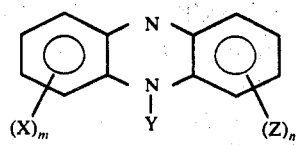

wherein X and Z are independently selected from the group consisting of —NH$_2$ and —NHR;

R is phenyl or phenylsulfonate;

Y is phenyl; and m and n can range from 0 to 2, with the proviso that either m or n is at least 1, and ii. about 1 to about 5 weight percent or a mixture of polymeric materials containing from about 20 to about 80 weight percent of at least one polymer of the formula (I)

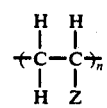

wherein Z is a pendant group of the formula

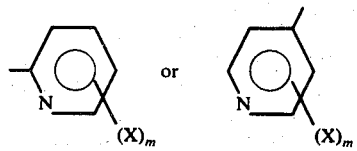

X is a substituent substantially incapable of withdrawing electrons from the electron rich pyridinyl moiety;

m is a whole number from 0 to 3; and n is a whole number in excess of 25; and, from about 20 to 80 weight percent of at least one polymer having structural units of the formula (II)

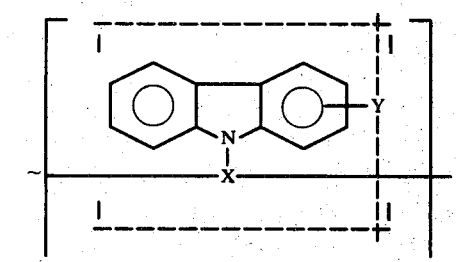

wherein X is vinyl, alpha alkyl substituted vinyl, or alkyl of 1 to 4 carbon atoms, and Y is vinyl, alpha alkyl substituted vinyl or alkyl of 1 to 4 carbon atoms with the proviso that when only one of either X or Y is vinyl or alpha alkyl substituted vinyl per structural unit.

At least a portion of the dye and the polymer mixture are intimately associated with the pigment thereby resulting in its desensitization. The combined effects of materials on the desensitized vanadyl phthalocyanine pigments reduces the electronic interaction of these pigments, upon photoactivation, with non-photoactivated pigments used in conjunction therewith. In addition, such modification reduces the affirmity of the desensitized vanadyl phthalocyanine pigments for acceptance of charge carriers from other source, thus, rendering them less susceptible to alteration in their photomigratory response characteristics from extrinsic sources of charge carriers.

Substituted compounds (also referred to herein as "desensitizing dyes") which are preferred in the compositions of this invention include the indulines, phenosafranine, nigrosine and aniline black. The mixture of polymeric material which are preferred for use in the compositions of this invention include at least one of the following polymers:

poly(2-vinylpyridine) or
poly(4-vinylpyridine); and, at least one of the following polymers:

poly(N-vinylcarbazole);
poly(2-vinylcarbazole) and the homologues thereof; and
poly(3-vinylcarbazole) and the homologues thereof.

DESCRIPTION OF THE INVENTION INCLUDING PREFERRED EMBODIMENT

The photosensitive compositions of this invention can be prepared by co-dissolving vanadyl phthalocyanine pigment and a desensitizing dye of the formula set forth hereinabove in an acidic medium. Following separation of the dye-desensitized pigment particles from this liquid, they can be further modified by dispersion in a solution of polymeric treatment materials. This dispersion is then preferably ball-milled for an interval sufficient to promote sorption of at least some of the polymeric materials onto the dye desensitized pigment. The polymer solvent can then be driven off, or preferably, an insulating carrier fluid (such as mineral oil) added to the dispersion and the resultant mixture heated in a manner so as to effect selective evaporation of the polymer solvent. The above procedure yeilds a photosensitive composition in which at least a portion of the vanadyl phthalocyanine pigment is intimately associated with at least some of the desensitizing dye, and at least some of the polymeric materials.

New York (1963). U.S. Pat. No. 3,825,422 (to Gruber and Grushkin) specifically describes the preparation of vanadyl phthalocyanine pigments for use in photoelectrophoretic imaging systems.

Once having prepared a vanadyl phthalocyanine pigment, the pigment is further refined by "acid pasting" in concentrated sulfuric acid or other appropriate acidic medium. Acid pasting generally merely involves dissolving the unrefined vanadyl phthalocyanine pigment in the acidic medium and agitating the resulting solution. The temperature of the acid pasting medium is not allowed to rise to a level which could result in decomposition of the pigment. The pigment can be contacted with the desensitizing dye concurrent with or subsequent to such refinement process. Subsequent to this acid pasting procedure the pigment is separated from the acidic solution by quenching in water or pouring over ice. Materials not dissolved during the acid pasting procedure are separated from the acidic solution by filtration prior to quenching with water. The terms "photosensitive", "photomigratory", "photoactive" and "photoelectrically active" are used interchangeable throughout this disclosure to describe the photoelectric properties of the above pigments of the compositions of this invention.

The substituted phenazine compounds of the photosensitive compositions of this invention are preferably soluble in a liquid within which the vanadyl phthalocyanine is soluble. Most, if not all of the compounds within the scope of the formula previously set forth herein are commercially available or can be prepared by techniques disclosed in the technical literature from readily available starting materials.

In the preferred compositions of this invention, the substituted phenazine compound used in the "treatment" of vanadyl phthalocyanine pigments are sulfonated indulins. These preferred compounds can be either one or a combination of the materials whose structural formulae are set forth hereinbelow:

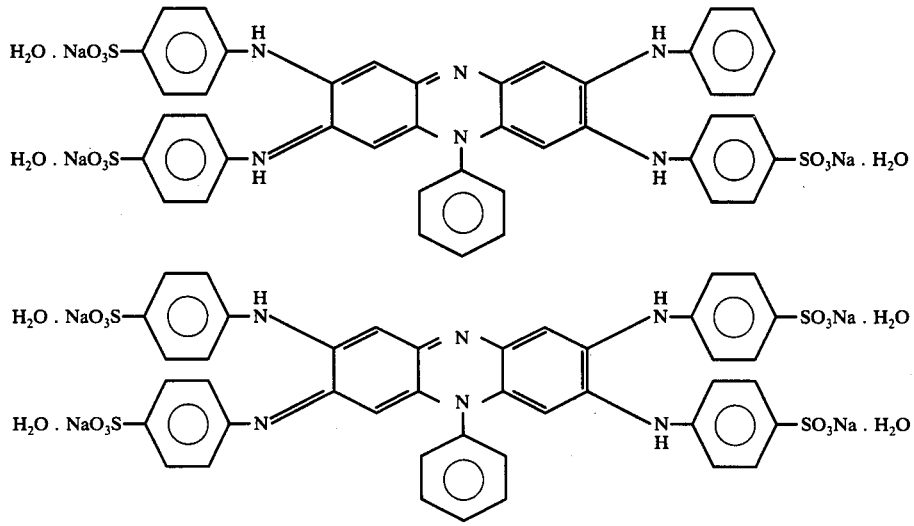

The pigment component of this composition can comprise vanadyl phthalocyanine in any one of its stable forms. The vanadyl phthalocyanine pigment can be prepared by any one of the techniques disclosed in the technical and patent literature, see for example, Moser and Thomas, *Phthalocyanine Compounds*, Chapter 3, ACS Monograph Series, Reinhold Publishing Corp., As indicated previously, most if not all of the pigments and dyes referred to hereinabove are readily commercially available or can be prepared by any one of numerous techniques disclosed in the literature. The preferred dyes whose formulae are set forth hereinabove can be readily prepared by the procedures described by F.

Kehrmann et al; his synthesis appearing in Ber. 56, 2394 (1923); Helv. Chim. Acta, 8, 61 (1925); Ber., 46, 3009 (1913); and Helv. Chim. Acta, 8, 63 (1925). The Kehrmann synthesis is directive for the compounds whose formulae are set forth hereinabove and is, thus, a preferred route for their preparation.

The relative concentration of desensitizing dye to pigment particles is a function of the relative efficiency with which such dye is capable of sorption on the pigment and the extent of intended modification of the photoelectric response of the pigment. Generally, the relative concentration of desensitizing dye to pigment can range from about 0.1 to about 10 weight percent. In a preferred embodiment of this invention, the desensitizing dye to pigment concentration is in the range of from about 1 to about 5 weight percent. It will be appreciated that certain desensitizing dyes can interact more efficiently with vanadyl phthalocyanine than do others and, thus, the preferred concentration of desensitizing dye to pigment may vary from one composition to another.

The polymeric materials which are associated with the above desensitized pigment can comprise any one or combination of polymer segments having structural units of the formula set forth hereinabove.

The vinyl pyridine-like monomers of the mixture useful in treatment of these desensitized vanadyl phthalocyanine pigments, are generally commercially available, and where unavailable from commercial sources can be routinely prepared by methods disclosed in the literature from readily available materials. Vol. for example, *Vinyl and Diene Monomers,* Vol. XXIV, part 3, page 1376, Edited by E. C. Leonard, Wiley-Interscience Publication, N.Y.C. (1971). These monomers can be polymerized by standard free radical and anionic polymerization techniques. In the preferred embodiments of this invention, the polymeric material of the mixture comprises poly(2-vinylpyridine).

The monomers useful in preparation of carbazyl functional polymer and substituted carbazyl functional polymers of the mixture, are also commercially available and can be prepared in accord with the techniques disclosed in the literature; See G. Wittig et al, Chem. Ber., 87, 1318 (1954) and Chem. Ber., 88, 1655 (1955) for preparation of N-alkyl-3-vinylcarbazole monomer; and Hyde, Kricke and Ledwith, Polymers 14, 124 (1973) for preparation N-alkyl-2-vinyl carbazole. These monomers, can be readily polymerized by standard free radical, anionic and cationic polymerization techniques.

The method of association of the desensitized photomigratory pigment with the above polymers will to some extent limit the type of polymers suitable for use in such interaction. For example, where the composition is prepared as described previously (solvent sorption of polymer on desensitized pigment), these polymers cannot, as a practical matter, be extensively cross-linked without adversely affecting their solubility and thus their ability to be associated with the desensitized pigment. The relative molecular weight of the polymers suitable for use in compositions of this invention does not otherwise appear to be critical.

Polymers of 2-vinylpyridine having a number average molecular weight in the range of from about $10^3$ to $10^6$ are especially suitable for preparation of the compositions of this invention by the above procedures; with polymers of 2-vinylpyridine having a molecular weight in the range of 7000 to 10,000 being preferred. There is, however, an increasing tendency for polymers of 4-vinylpyridine to cross-link as their number average molecular weight exceeds 4000, and thus alternate methods of preparation of the photosensitive composition with this polymer are preferable to that described above. It is understood that any reference herein to the molecular weights of the vinyl pyridine-like polymers of this composition is based upon results obtained by gel permeation chromatography techniques using the Q values for polystyrene as a reference.

The vinyl pyridine monomers and substituted vinyl pyridine monomers corresponding to the above formula can also be randomly copolymerized with a number of vinyl monomers and acrylate monomers. The structural units contributed to the copolymer by these vinyl and acrylate monomers must of course be electrically compatible with the comtemplated environment of use of the resultant materials. That is, the structural units contributed to the resultant copolymers by these monomers, must be substantially incapable of modification of the electronic interaction of the vinyl pyridine units or substituted vinyl pyridine units of the copolymer with the vanadyl phthalocyanine pigment. Vinyl monomers which satisfy the above requirements include styrene, alpha methyl styrene, para methyl styrene and 4-isopropyl styrene. Acrylate monomers which satisfy the above requirements include n-butylmethacrylate, methyl methacrylate and ethyl methacrylate. Generally, any one or more of these materials can be copolymerized with the vinyl pyridine monomers and/or substituted vinyl pyridine described hereinabove in accord with standard free radical and anionic initiated polymerization techniques. If desired, these same materials can be formed into block copolymers by standard anionic polymerization techniques. For example, one of the monomers of the block copolymer can be initially polymerized under conditions designed to produce an unterminated radical on the polymer segment formed from the first monomer. The second monomer can then be added to the charge, whereupon the radical portion of the previously polymerized material will serve to initiate polymerization of the newly added monomer and result in its propagation on the prepolymerized polymer segment.

Similar constraints also govern the degree of polymerization of the polymers prepared from the aforedescribed carbazyl and substituted carbazyl functional monomer. These monomers can be similarly copolymerized with the above vinyl and acrylate monomers.

Irrespective of which type of copolymers which are formed from the above materials, the total concentration of structural units contributed by the vinyl pyridine and/or substituted vinyl pyridine monomers relative to the structural units contributed by the other monomers should generally exceed sbout 20 to preferably 50 mole percent. Similarly, the relative concentration of structural units contributed by the carbazyl and substituted carbazyl functional monomers in such copolymers should also exceed 20 and preferably 50 mole percent.

Copolymers formed from the various combinations of pyridine like monomers disclosed hereinabove are also contemplated as suitable for treatment of the vanadyl phthalocyanine pigment. Similarly, copolymers formed from the various combination of carbazyl and substituted carbazyl functional monomers can be used as in treatment of the above pigments. In addition copolymers formed from a monomer of formula I and a monomer of formula II are also contemplated as useful in the treatment mixture.

The effective relative concentration of polymer to desensitized pigment particle is a function of the relative efficiency with which such polymer is capable of sorption on the pigment and the described modification of the photoelectric response of the pigment. Generally, the relative concentration of polymer to desensitized pigment in the composition will range from at least about 5 to about 20 weight percent. In a preferred embodiment of this invention, the polymer to desensitized pigment concentration is in the range of from about 5 to about 10 percent. It will be appreciated that certain polymers interact more efficiently with desensitized vanadyl phthalocyanine than do others and thus the preferred concentration of polymer to desensitized pigment may vary from one composition to another.

The photomigratory pigment composition prepared from the above materials can be dispersed in an insulating carrier liquid and the resulting dispersion will be suitable for use in both photoelectrophoretic and photoimmobilization electrophoretic recording systems and methods. This insulating carrier liquids dispersion medium preferably possesses a resistance of at least $10^7$ ohm-cm or greater. Materials which satisfy these requirements and which are chemically compatible with the photomigratory pigment compositions of this invention include saturated hydrocarbons such as decane, dodecane, N-tetradecane, molten paraffin, molten beeswax and other moltent thermoplastic materials. Sohio Odorless Solvent (a kerosene fraction available from Standard Oil of Ohio), Isopar G (a long chain saturated aliphatic hydrocarbon available from Humble Oil Co. of New Jersey) and Klearol (a mineral oil product available from Witco Chemical Corp. of New York City) are generally preferred as insulating liquid carriers.

The desensitized vanadyl phthalocyanine/polymer particles obtained as described above may be dispersed in the insulating carrier liquid with at least one other pigment having its principal region of light absorption substantially outside the region of principal light absorption of the photomigratory pigment of the composition of this invention. In a preferred embodiment of this invention, the photoelectrically active pigment/polymer particles are dispersed in the insulating carrier liquid along with a photoelectrically active magenta colored pigment and a photoelectrically active yellow colored pigment.

In a typical photoelectrophoretic imaging system (PEP) the total pigment concentration in the insulating carrier liquid should preferably be in the range of from about 2 to about 10 weight percent. In the event that the photomigratory pigment dispersion is to be used in a photoimmobilization electrophoretic recording (PIER) process of the type described in U.S. Pat. No. 3,976,485, the useful range of pigment concentration can be as low as about 0.01 weight percent and can preferably range from about 0.1 up to about 1.5 weight percent.

The photomigratory pigments of the composition of this invention can have a particle size within the range of from about 0.1 to about 3 microns. The relative particle size of the pigments in the insulating carrier liquid need not be uniform and in fact a particle size distribution within the previously stated range may provide certain enhanced imaging capabilities. In a typical photoelectrophoretic or photoimmobilization electrophoretic recording system, the photomigratory pigment/insulating liquid carrier dispersion is passed through an imaging zone defined by two electrodes; one of which is nominally designated as the "injecting electrode" and the other being nominally designated as the "blocking electrode". In the context of this invention, the blocking electrode is regarded as an electrode which is substantially incapable of effecting charge exchange with the photomigratory pigments; whereas, the injecting electrode freely exchanges charge with the photoactivated photomigratory pigments. In a photoimmobilization electrophoretic recording system, the injecting electrode will be typically coated with a dark injecting substance, such as a Lewis acid. The gap between the electrodes, which defines the imaging zone, can range from about 10 to about 250 microns. In order to achieve satisfactory image resolution and density with minimal background, the dielectric strength of the pigment dispersion at the imaging zone must be sufficient to support a field of at least 12 volts per micron; however, in order to achieve imaging capabilities of superior quality, the liquid dispersion should be preferably capable of supporting a field of about 40 volts per micron.

As indicated previously, the intimate association of polymers with vanadyl phthalocyanine can under certain conditions result in agglomeration of this pigment. In those compositions where the concentration of polymer necessary to achieve modification of the photoelectric properties of the desensitized pigment results in excessive pigment agglomeration, it may be desirable to reduce the polymer concentration somewhat (by about 1 to 25%) and add small quantities (0.5 to about 5 mole percent based upon vanadyl phthalocyanine concentration) of electron acceptor compounds. Electron acceptor compounds which are effective modifiers of the photoelectric properties of vanadyl phthalocyanine pigment include 2,4,7-trinitro-9-fluorenone nd the malononitrile analogues thereof.

The Examples which follow further define, describe and illustrate the preparation and use of the densensitized vanadyl phthalocyanine/polymer particles of the compositions of this invention. Apparatus and techniques used in the preparation and evaluation of such materials are standard or as hereinbefore described. Parts and percentages appearing in such examples are by weight unless otherwise stipulated.

EXAMPLE I

Synthesis of Vanadyl Phthalocyanine

Into a 12 liter flask equipped with a magnetic stirrer and an air condenser are added 247 grams of phthalic annydride, 247 grams of urea, 3 liters of chloronaphthalene and 100 grams of vanadium trichloride. The mixture is then heated to boiling under reflux conditions for approximately 45 minutes, cooled to 25° C and thereafter filtered. The solids which are recovered are washed with 300 mls of ethanol, then slurried in 100 mls of ethanol for two hours and subsequently filtered. The recovered pigment is thereafter subjected to a series of washes which are carried out at 70° C, each wash lasting approximately 2 hours: first wash, 2 liters of 10% sodium hydroxide solution; second wash, 2 liters of 20% hydrochloric acid; and third wash, 2 liters of deionized water. The pigment is recovered by filtration, the filter cake allowed to air dry for 24 hours and then dried in a vacuum oven at 65° C. The material produced in the manner which is described above is further refined by an acid pasting technique which is performed as follows:

About 7.5 grams of unrefined vanadyl phthalocyanine is dissolved in 40 mls of concentrated sulfuric acid and stirred for about 50 minutes (the temperature of the system being carefully monitored so as to not permit the solution temperature to exceed 35° C). The solution is then poured through a coarse fritted funnel and sprayed into one liter of water which is maintained at a temperature in the range of from about 18° to 25° C. The spray injection of the filtrate is accomplished by means of two concentric glass tubes, so positioned as to create a vacuum at the orifice of the center tube when air is forced between the inner wall of the larger tube and outer wall of the smaller tube. Liquid passing through the smaller tube is atomized at the orifice by the passage of air between the two walls.

The crystals, which are produced in the manner described above, are re-dispersed in water, filtered through a medium porosity filter, followed by five slurry water washes (750 ml each) at 70° C. The third and fourth washing solutions are modified in that they contain 18 mls of concentrated ammonium hydroxide. The filter cake which is ultimately recovered, subsequent to washing, is air dried and then dried in a vacuum oven at 65° C.

EXAMPLE II

Preparation of Poly(2-vinylpyridine) by free radical solution polymerization

Commerically available 2-vinylpyridine (obtained from Reilly Tar and Chemical Co., Indiannapolis, Indiana) is initially purified by vacuum distillation at 5 Torr and 38° C. Azobisisobutyronitrile was selected as the free radical initiator for use in this synthesis (available from Eastman Kodak Co. of Rochester, New York).

Into a 3 neck 100 ml round bottom flask equipped with a mechanical stirrer, a sparging tube and a reflux condenser is poured 45 mls of benzene. The temperature of the flask and its contents are elevated to about 50° C and maintained at this level for approximately 2 hours while the benzene is sparged with argon. About 150 mgs (0.75 weight percent) of azobisisobutyronitrile are introduced into the flask followed by 20 grams of 2-vinylpyridine. The solution is maintained at 50° C for 12 hours under argon and then at 55° C for an additional 24 hours. The solution is cooled to 35° C and diluted with 150 mls tetrahydrofuran. The benzene/tetrehydrofuran/polymer solution is added dropwise to a mixture containing approximately 6 pints petroleum ether and 4 pints hexane. The solvent mixture is maintained in a constant state of agitation during the dropwise addition of the polymer solution. The addition of the polymer solution to this solvent quenches the polymerization and results in precipitation of the polymer. The polymer solids are recovered by filtration washed with petroleum ether and dried at 70° C in an air circulating oven overnight. Yield: 80% (16 grams) of cream colored polymer are obtained, Mn = 36K; Mw = 63.8K; MWD = 1.77. Number average molecular weight and weight average molecular weight analysis by gel permeation chromatography based upon a Q factor of 41.

EXAMPLE III

Preparation of poly(N-ethyl-3-vinylcarbazole)

The monomer of this polymer is synthesized from N-ethyl-carbazole-3-carboxaldehyde in accord with the procedures described by G. Wittig et al for preparation of olefins from alkylidenephosphoranes an carbonyl compounds- the so-called Wittig synthesis - Chem. Ber. 87.1318 (1954) and Chem. Ber. 88 1655 (1955).

N-ethyl-3-vinylcarbazole is prepared as follows: triphenylmethylphosphonium bromide, 35.72g (0.1 mole), and 300 ml anhydrous tetrahydrofuran (THF) are placed in a 2 liter three necked flask. The contents of the flask are blanketed with argon and then 46 ml of a 2.18 molar solution of butyl lithium in hexane (0.1 mole) is added to the vigorously stirred solution over a period of 15 minutes. The resultant mixture is allowed to react for 2 hours and then N-ethylcarbazole-3-carboxaldehyde, 22.33g (0.1 mole) in 150 l ml THF added to the reaction vessel over a period of 10 minutes. After heating to boiling under reflux conditions for 1.5 hours the reaction mixture is cooled to room temperature and treated with 750 ml hexane. After the precipitate which forms is discarded, the solvents are removed thus yielding a crude product which crystallizes on standing. Recrystallization is accomplished by adding a minimum amount of ethanol containing a drop of ammonium hydroxide. Yield 11.5g (52%) of N-ethyl-3-vinylcarbazole M.P. 66°-67° C.

The N-ethyl-3-vinylcarbazole is then purified on a silica gel column and eluted with hexane. Prior to attempting polymerization of this monomer, the polymerization solvent, spectrograde methylene chloride, is passed through a neutral alumina column and then used immediately. N-ethyl-3-vinylcarbazole, 4.0g in 80 ml of methylene chloride, is placed in a 100 ml double neck flask and blanketed with dry nitrogen. The solution is cooled to 60° C and then 8 microliters of boron trifluoride (etherate in 2 ml methylene chloride) added to the monomer solution which is being rapidly stirred with a magnetic stirring bar. After a few minutes, the viscosity of the solution increases to a point where further stirring becomes difficult. The reaction mixture is then quickly quenched in 400 ml methanol. The THF soluble polymer is reprecipitated several times with methanol. Yield 2.8g Mn330,000, MWD 2.97.

EXAMPLES IV-VI

Preparation of poly(2-vinylcarbazole) and homologues thereof.

The monomer of this polymer is synthesized in accord with the procedures described by Hyde, Kricke and Ledwith in Polymers 14, 124 (1973). According to their method, a mixture of 24 grams 2-acetyl carbazole and 40 gram aluminum isopropoxide in 75 milliliters of xylene is heated to boiling under reflux conditions. Such heating is continued for three hours, during which time acetone forms within the mixture and is removed therefrom by distillation. Upon cooling, particulates (principally aluminum isopropoxide) are removed from the mixture by filtration and the filtrate collected in water. Upon standing, the xylene and aqueous layers separate, whereupon the xylene is drawn off and the aqueous layer subsequently extracted with three 60 milliliter portions of ether. The combined extracts are washed with water and dried over anhydrous magnesium sulfate (MgSO$_4$/NaOH). Evaporation of the ether yields 2-vinylcarbazole monomer.

This monomer can be alkylated by simply contacting a solution of said monomer in dimethylformamide/ether with thallous ethoxide/alkyl iodide (excess). The monomers thus prepared can be readily formed into polymers by standard free radical, cationic and/or anionic polymerization techniques.

| Example No. | Carbazyl Functional Polymer |
| --- | --- |
| IV | poly(2-vinylcarbazole) |
| V | poly(N-ethyl-2-vinylcarbazole) |
| VI | poly(N-methyl-2-vinylcarbazole) |

EXAMPLE VII

Indulin 6B tetrasulfonate (CI 50405) is prepared according to the procedure described by Solodar and Monahan in Can. J. Chem., 54, 2909-2914 (1976).

-A-

The procedure of Example I is repeated, except for the addition of about 0.75 grams of Indulin 6B tetrasulfonate to an aqueous dispersion of the acid pasted vanadyl phthalocyanine pigment, (acid pasted pigment being dispersed directly into the dye solution prior drying of the pigment). After briefly slurrying these materials together, the solids are separated from the fluid by filtration and dried.

The desensitized vanadyl phthalocyanine pigment thus produced can be further modified by dissolving in a benzene solution containing 10 weight percent of a polymer mixture having equal parts by weight poly(2-vinylpyridine) and poly(N-vinylcarbazole). The desensitized pigment is separated from the benzene by evaporation.

-B-

Alternatively, the vanadyl phthalocyanine pigment can be associated with Indulin 6B tetrasulfonate by initially milling dried acid pasting vanadyl phthalocyanine pigment in alcohol (95% absolute alcohol) followed by dispersal of the pigment in aqueous solutions. The Indulin 6B tetrasulfonate is added to this aqueous pigment dispersion, the materials allowed to interact briefly and the solids separated from the liquid by filtration. The filtrate can be collected and analyzed colormetrically to determine the extent of adsorption of dye by the pigment.

-C-

In yet another alternative procedure, the acid pasted vanadyl phthalocyanine is milled in benzene and a benzene/ethanol solution of the dye added thereto. Milling continues for a relatively brief interval after which sufficient mineral oil (Klearol, Witco Chemical Co., New York City) is added to the dispersion. The benzene/ethanol fraction is removed by selective evaporation (flash evaporation techniques) and additional mineral oil added to produce a desensitized pigment dispersion in which the pigment concentration is in the range of from 8-10% be weight.

-D-

In yet another alternative treatment method, the dye can be added directly to the acid solution of pigment during the acid pasting process.

EXAMPLE VIII

The polymer treated desensitized pigment prepared in the manner described in Example VII, Part A is combined with a mineral oil dispersion of photoelectrically active magenta pigment and a mineral oil dispersion of photoelectrically active yellow pigment. The relative pigment concentrations in the dispersion are approximately 1:1:1. The combined pigment concentration in the mineral oil is in the range of from about 8-10 percent by weight.

The imaging qualities of resultant dispersion are evaluated in a photoelectrophoretic imaging mode of the type described in U.S. Pat. No. 3,384,488 (previously incorporated by reference in its entirety).

The above procedure is repeated with similarly polymer treated vanadyl phthalocyanine pigment which has not undergone desensitization. Comparison of images produced by the respectives "trimixes" indicates improved green rendition and speed conformity within the trimix containing the desensitized vanadyl phthalocyanine pigment.

EXAMPLE IX

About 1 gram of the pigment, as prepared in the manner described in Example VII, Part A, first paragraph, is dispersed in a benzene solution containing 10 weight percent of a mixture, (based upon pigment content) containing equal parts by weight of poly(2-vinylpyridine) and poly(N-ethyl-3-vinyl carbazole). The dispersion is then transferred to a 60 ml jar containing 20 cubic centimeters of ⅛ inch stainless steel shot. The jar is sealed and its contents milled for 8 hours at 250 rpm. The dispersion is thereafter transferred to a 250 ml round bottom flask containing 30 mls of mineral oil (Klearol, Witco Chemical Corporation, New York City). The jar and shot are washed with about 35 to 40 mls of benzene and the benzene wash also transferred to the 250 ml round bottom flask. The flask is set in a water bath at 70° C on a flash evaporator, the pressure reduced to 20 Torr thereby resulting in the evaporation of benzene from the flask. The pressure is then further reduced to between 60 and 100 Torr and maintained at this level for about 1 additional hour.

The above polymer treatment of the vanadyl phthalocyanine pigment can also be accomplished by initially milling the pigment in benzene and then subsequently treating the milled pigment with a benzene/polymer solution. The polymeric materials which do not become associated with the pigment can be removed by simply centrifuging the benzene dispersion. The heavier pigment particles will settle out and the benzene solution containing the free polymer can be simply siphoned off. It is thus possible using this technique to indirectly determine the amount of polymer which is associated with the pigment. Repeating the above treatment with up to 30 weight percent of the polymer mixture indicates that satisfactory pigments are produced when the amount of polymer associated with the pigment is in the range of about 4 to 5 percent. Increasing the polymer in the benzene solution to in excess of 30 weight percent does not apparently increase the amount of polymer associated with the pigment.

The precise relationship between the pigment and the polymer is ill-defined. It is believed that some of the polymer is deposited on the surface of the pigment, however, the nature and extent of this surface deposit is insufficient to result in encapsulation of the pigment particles.

The above procedure is repeated with a mixture of poly(2-vinylpyridine) and the following carbazyl functional polymers:
poly(N-ethyl-2-vinylcarbazol)
poly(N-propyl-3-vinylcarbazole)
poly(N-methyl-3-vinylcarbazole)
poly(N-butyl3-vinylcarbazole)

What is claimed is:
1. A photosensitive composition containing at least about 0.01 weight percent vanadyl phthalocyanine pigment dispersed in an insulating carrier liquid, and in at least partial association with said pigment
   i. from about 0.01 to about 10 weight percent of a desensitizing dye of the formula

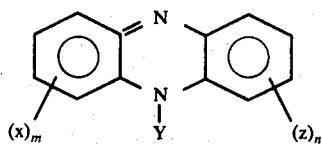

wherein X and Z are independently defined as members selected from the group consisting of —NH$_2$ and —NHR in which R is defined as a phenyl or phenylsulfonate substituent;
   Y is defined as a phenyl group; and
   m and n are individually defined as integers of 0–2, either m or n being defined as at least 1; and
   ii. about 1 to about 5 weight percent or a mixture of polymeric materials containing from about 20 to about 80 weight percent of at least one polymer having repeating structural units of the formula

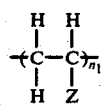

wherein Z is defined as a group of the formulae

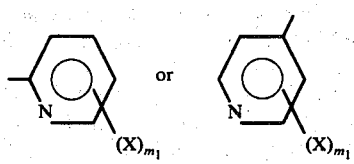

in which X is a substituent substantially incapable of withdrawing electrons from the pyridinyl moiety;
   $m_1$ is a whole number from 0–3;
   $n_1$ is a whole number in excess of 25;
   and from about 20 to 80 weight percent of at least one polymer having structural units of the formula

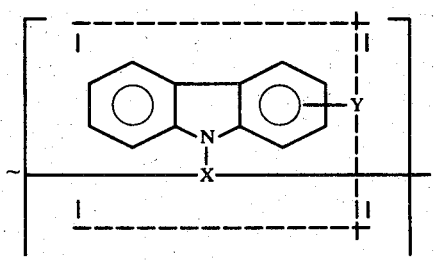

wherein X is vinyl, alpha-alkyl-substituted vinyl, or alkyl of 1 to 4 carbon atoms; and
   Y is vinyl, alpha alkyl-substituted vinyl or an alkyl of 1 to 4 carbon atoms, only one of either X or Y being defined as a vinyl or alpha alkyl-substituted vinyl group per structural unit.

2. The composition of claim 1, wherein the polymeric mixture contains poly(N-vinylcarbazole) and poly(2-vinylpyridine).
3. The composition of claim 1, wherein the phenazine-like component is defined as an indulin derivative or an acid salt thereof.
4. The composition of claim 1, wherein the pigment concentration in the dispersion ranges from about .1 to about 10 weight percent.
5. The composition of claim 1, wherein the insulating carrier liquid is a mineral oil.
6. The composition of claim 1 wherein the insulating carrier liquid is a saturated aliphatic hydrocarbon or kerosene.
7. An imaging process comprising:
   a. providing a photosensitive composition containing at least about 0.01 weight percent vanadyl phthalocyanine pigment dispersed in an insulating carrier liquid, and in at least partial association with said pigment
   i. from about 0.01 to about 10 weight percent of a compound of the formula

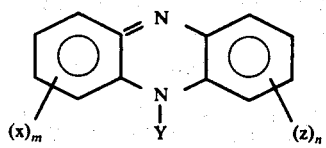

wherein X and Z are independently defined as members selected from the group consisting of —NH$_2$ and —NHR in which R is defined as a phenyl or phenylsulfonate substituent;
   Y is defined as a phenyl group; and m and n are individually defined as integers of 0–2, either m or n being defined as at least 1, and
   ii. about 1 to about 5 weight percent or a mixture of polymeric materials containing from about 20 to about 80 weight percent of at least one polymer of the formula

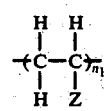

wherein Z is a pendant group of the formula

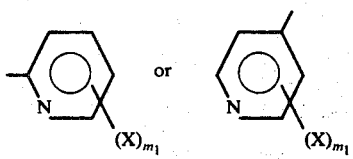

in which X is a substituent substantially incapable of withdrawing electrons from the pyridinyl moiety;
   $m_1$ is a whole number from 0 to 3; and
   $n_1$ is a whole number in excess of 25; and
   from about 20 to 80 weight percent of at least one polymer having structural units of the formula

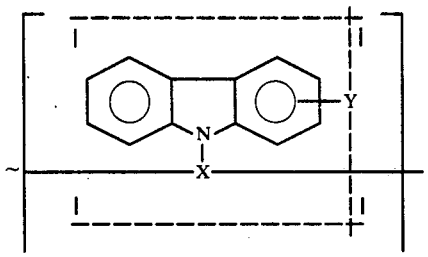

wherein X is a vinyl, alpha alkyl-substituted vinyl, or alkyl or 1 to 4 carbon atoms, and Y is a vinyl, alpha alkyl substituted vinyl or alkyl of 1 to 4 carbon atoms with the proviso that when only one of either X or Y is vinyl or alpha alkyl substituted vinyl per structural unit;

b. confining sid dispersion between a pair of electrodes;

c. applying an electric field across said dispersion; and d. subjecting said dispersion to an image pattern of activating electromagnetic radiation concurrent with maintenance of an electric field across said dispersion.

8. A method for controlling photoresponsiveness in a photoelectrophoretic imaging system comprising particles of vanadyl phthalocyanine pigments in an insulating carrier liquid situated between two or more electrodes, comprising utilizing as vehicle and pigment composition, a composition containing at least about 0.01 weight percent vanadyl phthalocyanine pigment dispersed in an insulating carrier liquid, and in at least partial association with said pigment i. from about 0.01 to about 10 weight percent of a compound of the formula

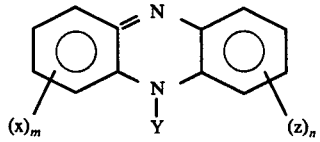

wherein X and Z are independently defined as members selected from the group consisting of —NH$_2$ and —NHR in which R is defined as a phenyl or phenylsulfonate substituent;

Y is defined as a phenyl group; and $m$ and $n$ are individually defined as integers of 0–2, either $m$ or $n$ being defined as at least 1; and ii. about 1 to about 5 weight percent or a mixture of polymeric materials containing from about 20 to about 80 weight percent of at least one polymer of the formula

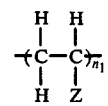

wherein Z is a pendant group of the formula

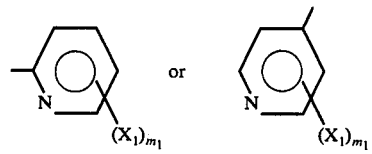

in which $X_1$ is a substituent substantially incapable of withdrawing electrons from the pyridinyl moiety;

$m_1$ is a whole number from 0 to 3; and $n_1$ is a whole number in excess of 25; and from about 20 to 80 weight percent of at least one polymer having structural units of the formula

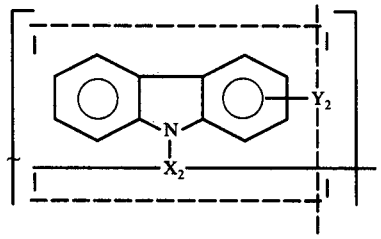

wherein $X_2$ is a vinyl, alpha alkyl substituted vinyl, or alkyl of 1 to 4 carbon atoms, and $Y_2$ is defined as a vinyl, alpha alkyl-substituted vinyl, or alkyl of 1 to 4 carbon atoms, only one of either $X_2$ or $Y_2$ being defined as vinyl or alpha alkyl substituted vinyl per structural unit.

* * * * *